United States Patent
Ogawa

[11] Patent Number: 6,015,237
[45] Date of Patent: Jan. 18, 2000

[54] TRACK ROLLER BEARING WITH STUD

[75] Inventor: Yoshitaka Ogawa, Gifu, Japan

[73] Assignee: Nippon Thompson Co., Ltd., Tokyo, Japan

[21] Appl. No.: 08/991,769

[22] Filed: Dec. 16, 1997

[30] Foreign Application Priority Data

Jan. 9, 1997 [JP] Japan .................................. 9-013407

[51] Int. Cl.[7] ............................ F16C 19/00; F16H 53/06
[52] U.S. Cl. ........................................... 384/475; 74/569
[58] Field of Search .................................. 384/462, 466, 384/473, 474, 475; 74/569; 138/89, 89.4, 96 R; 184/105.3

[56] References Cited

U.S. PATENT DOCUMENTS

| | | | |
|---|---|---|---|
| 2,265,554 | 12/1941 | Thomas | 74/569 |
| 2,770,508 | 11/1956 | Smith | 74/569 X |
| 3,448,772 | 6/1969 | Delamater | 138/89 |
| 3,574,312 | 4/1971 | Miller | 138/96 R |
| 3,596,533 | 8/1971 | Nightingale | 74/569 X |
| 3,752,543 | 8/1973 | Schmidt | 384/484 |
| 4,113,327 | 9/1978 | Koch | 384/482 |

*Primary Examiner*—Thomas R. Hannon
*Assistant Examiner*—Brandon C Stallman
*Attorney, Agent, or Firm*—Sughrue, Mion, Zinn, Macpeak & Seas, PLLC

[57] ABSTRACT

The track roller bearing with stud is a track roller bearing with stud that has a low production cost and offers easy handling in which lubrication work can be performed from either end of the stud. As a result of providing lubricant supply ports connected to lubricating paths $21g$ and $21h$ for supplying lubricant to rolling elements 24 and so forth in the form of lubricant supply port $21m$ continuing from hexagonal hole 21 in addition to lubricant supply port $21n$ on the side of threaded portion $21e$ of stud 21, lubrication can be performed from both ends of stud 21.

3 Claims, 8 Drawing Sheets

TRACK ROLLER BEARING WITH STUD

BACKGROUND OF THE INVENTION

1. Field of the Invention

The present invention relates to a track roller bearing with stud for smoothly guiding linear motion and so forth in a machine tool or industrial robot and so forth, which is also commonly used as a cam follower.

2. Description of the Prior Art

FIG. 1 is an example of a track roller bearing with stud of the prior art.

As shown in FIG. 1, this track roller bearing with stud is equipped with stud 1, outer ring 2, side plate 3, a plurality of rollers 4 and cage 6.

Stud 1 is composed in the shape of a shaft in which is formed, in order from one end surface, flange 1a, a track portion in the form of track surface 1b, side plate engaging portion 1c, attaching portion 1d and threaded portion 1e.

Outer ring 2 is in the form of a thick-walled ring in which one end is prevented from coming out in the axial direction by flange 1a and having a larger diameter than the outer diameter of the flange 1a. Track surface 2b is formed on the inside of outer ring 2. Outer ring 2 is installed while being allowing to rotate freely with respect to track surface 1b of stud 1.

A plurality of rollers 4 are juxtaposed in the form of rolling elements between track surfaces 1b and 2b.

In addition, cage 6 is provided which retains a plurality of rollers 4 between track surfaces 1b and 2b at mutual intervals.

Side plate 3 is located on the other end of outer ring 2 corresponding to flange 1a and is composed of a doughnut-shaped plate having a diameter similar to the outer diameter of the flange 1a. The inner diameter portion fits into side plate engaging portion 1c of stud 1 and prevents outer ring 2, the plurality of rollers 4 and cage 6 from coming out in the axial direction in cooperation with flange 1a.

In a track roller bearing with stud composed in this manner, outer ring 2 normally rotates relative to stud 1.

Stud 1 has lubricant supply hole 1g extending roughly over its entire length in its axial center. Lubricating holes 1h and 1i, which are respectively connected to track surface 1b and attachment portion 1d, are opened in the supply hole 1g. These supply hole 1g, lubricating holes 1h and 1i form a lubricating path for lubricant. Lubricant supply ports 1m and 1n are formed in both ends of stud 1. These lubricant supply ports 1m and 1n serve as lubricating oil intake ports for lubricant that passes through the lubricating path.

In addition, as shown in FIG. 2, slotted screwdriver groove 1p is formed in the end surface on the side of flange 1a of stud 1.

FIG. 3 shows an example of typical usage of a track roller bearing with stud.

As shown in FIG. 3, stud 1 of the track roller bearing with stud is inserted into housing 8 of a frame equipped on a machine tool and so forth, nut 11 is screwed onto threaded portion 1e of stud 1 protruding from the opposite side of the frame juxtaposed about spring washer 10, and stud 1 is tightened to fix in position by either turning this nut 11 with a wrench and so forth or by engaging a screwdriver into slotted screwdriver groove 1p and turning stud 1.

Normally, the surface of the outer diameter of outer ring 2 makes sliding contact with the track of a linear path or the track of a cam mechanism in the form of track 13 which causes outer ring 2 to rotate resulting in relative motion with the track 13.

In the attached state described above, in the case of lubricating with grease, a grease supply device in the form of a grease nipple (not shown) is attached to either of lubricant supply ports 1m or 1n, whichever makes lubrication work easier. The lubricant supply port that is not used is blocked with a plug (not shown). In addition, lubricating hole 1i, which opens into attaching portion 1d of stud 1, is blocked by housing 8. A suitable amount of grease is supplied by a grease gun and so forth into the above grease nipple which causes grease in the form of lubricant to fill the inside of the above lubricating path. This results in grease being supplied to track surfaces 1b and 2b of stud 1 and outer ring 2 as well as rollers 4 from lubricating hole 1h.

FIGS. 4 and 5 show a track roller bearing with stud as another example of the prior art.

This track roller bearing with stud is composed in the same manner as the above track roller bearing with stud with the exception of the points described below, and the same reference numerals are used for those constituent members that are identical or corresponding to the track roller bearing with stud described above.

Hexagonal hole 1r is formed in the end surface of stud 1 on the flange side of this track roller bearing with stud instead of the slotted screwdriver groove 1p. When attaching or removing, a hexagonal wrench is inserted into this hexagonal hole 1r to turn stud 1. This hexagonal hole 1r allows tightening to be performed more reliably than slotted screwdriver groove 1p, thereby offering the advantage of a more secure installation.

In addition, in terms of processing as well, although having a slotted screwdriver groove had to be processed by cutting to form grooves for a process of milling cutter and so on, since having hexagonal hole 1r offers the advantages of hexagonal hole 1r being able to be formed simultaneous to forging when obtaining the parent form of stud 1, thereby reducing the number of processing steps, and not having the processing difficulty associated with the ordinary screwdriver groove 1p, it has come to be widely used in recent years.

However, in the track roller bearing with stud having hexagonal hole 1r, lubricant supply port 1n is only provided on the end surface of stud 1 on the side of threaded portion 1e, to which grease nipple 15 is attached.

At present, track roller bearings with studs are widely used in various technical fields, and there is an extremely high demand for them. There is therefore a need for a track roller bearing with stud having a hexagonal hole that offers even easier handling.

The track roller bearing with stud having hexagonal hole (1r) that has come into wide use in recent years has the problem of the lubricant supply port to which grease nipple 15 can be attached only being provided on the side opposite from the hexagonal hole 1r, thus making it necessary to only provide lubrication from one side.

SUMMARY OF THE INVENTION

In consideration of the above problems of the prior art, the object of the present invention is to provide a track roller bearing with stud that has a low production cost and offers easy handling in which lubrication work can be performed from either end surface of the stud.

In order to achieve the above object, the track roller bearing with stud of the present invention comprises: a stud in the shape of a shaft in which is formed, in order from one end surface, a flange, a track portion in which the outer circumference serves as the track surface, a side plate engaging portion, an attaching portion and a threaded portion; an outer ring, one end of which is prevented from coming out in the axial direction by the flange, in the form of a thick-walled ring having a diameter larger than the outer diameter of the flange, having a track surface formed on its inside and inserted while allowing to rotate freely corresponding to the track surface of the stud; a plurality of rolling elements juxtaposed between the track surfaces; and, a side plate in the form of a doughnut-shaped plate similar in size to the outer diameter of the flange, located on the other end of the outer ring corresponding to the flange, the inner diameter of which engages with the side plate engaging portion, and serves to prevent the outer ring and rolling elements from coming out in the axial direction in cooperation with the flange; wherein, a hexagonal hole is formed in one end surface of the stud on the flange side that is able to engage with a tightening tool, and in which a lubricating path extending from a lubricant supply port to the track surfaces is formed in the other end of the threaded portion, a lubrication supply port to which a lubrication apparatus can be attached is formed in the hexagonal hole of the end surface of the stud that connects with the lubricating path continuing from the hexagonal hole.

In addition, a grease nipple in the form of the lubrication apparatus that can be attached to the lubricant supply port continuing from the hexagonal hole of the stud is provided, and the grease nipple is of a length that reaches to the lubricant supply port continuing from the hexagonal hole from the end surface of the stud.

In addition, the lubricant supply port continuing from the hexagonal hole of the stud and a lubricant supply port on the end surface of the other threaded portion are formed to allow the attachment of the grease nipple and moreover, an embedded plug is provided that can also be attached to either of the lubricant supply ports and that can be attached to one of the lubricant supply ports to which the grease nipple is not attached.

In addition, the embedded plug is a flanged embedded plug.

DESCRIPTION OF THE PREFERRED EMBODIMENTS

Next, an explanation is provided of the embodiments of the present invention with reference to the attached drawings.

Figure 6:
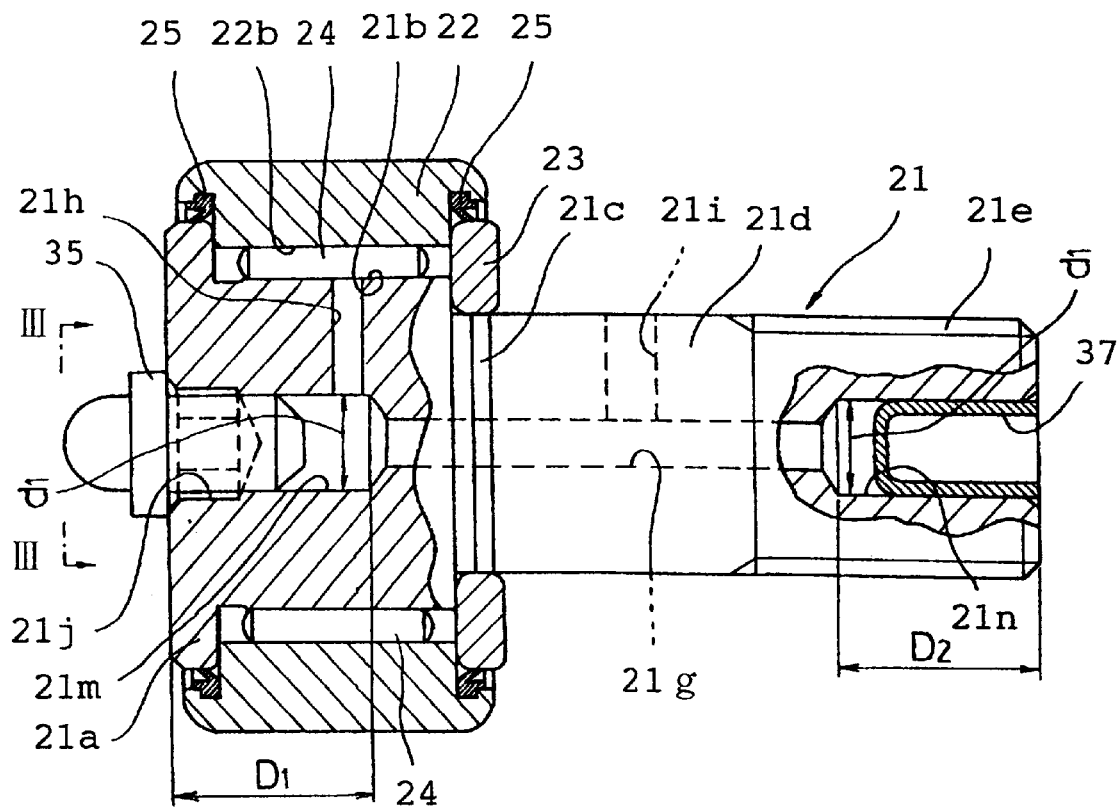
FIG. 6 is a front view, including a partial cross-section, of a track roller bearing with stud as a first embodiment of the present invention.

FIG. 6 shows a track roller bearing with stud as a first embodiment of the present invention.

As shown in FIG. 6, the track roller bearing with stud is equipped with stud 21 in the shape of a shaft and having a circular cross-section, outer ring 22, side plate 23, and a plurality of rolling elements in the form of needle rollers 24.

Stud 21 has, in order from one end surface, flange 21a, a track portion of which the outer circumference serves as track surface 21b, side plate engaging portion 21c having a smaller diameter than the track portion but a slightly larger diameter than the following attaching portion, attaching portion 21d that is attached to a housing of a machine frame and so forth, and threaded portion 21e on the end of the stud 21 that cooperates with a nut to tighten and secure the stud 21.

The ends of outer ring 22 are in the form of a step-shaped socket so as to contain flange 21a and side plate 23, respectively. One end of outer ring 22 is prevented from coming out in the axial direction by flange 21a. In addition, outer ring 22 is in the form of a thick-walled ring having a larger diameter than flange 21a and in which track surface 22b is formed in its inner circumference, and is inserted while allowing to rotate freely by means of rolling elements in the form of needle rollers 24 corresponding to track surface 21b of the stud 21.

A plurality of needle rollers 24 are juxtaposed between track surfaces 21b and 22b of stud 21 and outer ring 22.

Side plate 23 is located on the other end of outer ring 22 corresponding to flange 21a. It is in the form of a doughnut-shaped plate having a diameter similar to the outer diameter of the flange 21a. Its inner diameter portion engages with side plate engaging portion 21c of stud 21, and serves to prevent outer ring 22 and rollers 24 from coming out in the axial direction in cooperation with flange 21a.

Seal 25 made of synthetic rubber and so forth is juxtaposed between each of the outer surfaces of flange 21a and side plate 23 and outer ring 22. More specifically, the outside of the seal 25 is attached to the inside of outer ring 22 and a lip is formed in its inside. This lip makes sliding contact with the outer surfaces of flange 21a and side plate 23. As a result, the entry of foreign objects into the space in which each needle roller 24 is housed (within the track surface) can be prevented.

In a track roller bearing with stud composed in this manner, outer ring 22 normally rotates relative to stud 21.

Lubricant supply hole 21g (a lubricating duct) is formed in stud 21 over roughly its entire length through the center of its axis. Lubricating holes 21h and 21i that are respectively connected to track surface 21b and attaching portion 21*d* are opened in said lubricant supply hole 21*g*. These lubricant supply hole 21*g* and lubricating holes 21*h* and 21*i* form a lubricant lubricating path.

Lubricant supply port 21*n* that is connected with this lubricating path is formed in the end surface of stud 21 on the side of threaded portion 21*e*.

Figure 7:
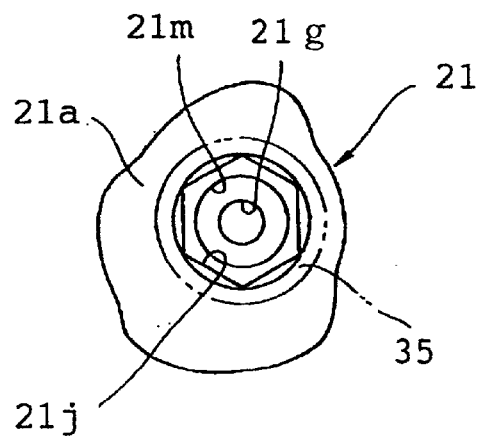
FIG. 7 is a view taken along arrows III—III of the state in which the grease nipple of the track roller bearing with stud shown in FIG. 6 has been removed.

In addition, as shown in FIG. 7 hexagonal hole 21*j* is formed in the end surface of stud 21 on the side of flange 21*a* in the center of its axis. The hexagonal hole 21*j* is for tightening and securing stud 21 by causing the stud 21 to rotate by engaging a tightening tool such as a hexagon wrench with the hexagonal hole 21*j*. This hexagonal hole 21*j* is formed simultaneous to the formation of stud 21 itself by forging. Accordingly, the number of production steps is reduced enabling production costs to be held to a low level.

Here, a brief explanation is provided of the production process of stud 21.

To begin with, a long steel member is cut to a suitable length and used as the base material of the stud. This base material is then forged to obtain the parent form of stud 21. During this forging, the hexagonal hole 21*j* is also formed. Next, the track surface 21*b* is formed by cutting (by cutting after quenching) in this parent form, threaded portion 21*e* is formed by cutting or rolling, and lubricant supply hole 21*g* along with lubricating holes 21*h* and 21*i* and lubricant supply port 21*n* are drilled with a drill.

Another lubricant or lubrication supply port 21*m* is formed continuing from the hexagonal hole 21*j* in the hexagonal hole in stud 21. This lubricant supply port 21*m* is similarly formed with a drill, and is connected with lubricant supply hole 21*g* and lubricating hole 21*h* which form the above lubricating path.

The lubricant supply ports 21*m* and 21*n* formed in both end surfaces of stud 21 are of the same diameter and are mutually of the same depth from the end surface of the stud 21. Lubricating apparatus in the form of grease nipple 35 and embedded plug 37 shown in FIGS. 8 and 9 can be attached to these lubricant supply ports 21*m* and 21*n*. When inserting grease nipple 35, fitting portion 35*a* of grease nipple 35 is inserted into lubricant supply port 21*m* or 21*n*. This fitting portion 35*a* and embedded plug 37 are roughly of the same diameter.

More specifically, if the diameter of the lubricant supply ports 21*m* and 21*n* is assumed to be $d_1$, the diameter $d_2$ of fitting portion 35*a* of grease nipple 35 and embedded plug 37 for said lubricant supply ports is set to be slightly larger so that it is inserted tightly.

In addition, if the depths of each lubricant supply port 21*m* and 21*n* from the end surface of stud 21 are assumed to be $D_1$ and $D_2$, respectively, the lengths $L_1$ and $L_2$ of fitting portion 35*a* of grease nipple 35 and embedded plug 37 are slightly smaller than these depths, and are set to adequately reach lubricant supply ports 21*m* and 21*n* by way of hexagonal hole 21*j* from the end of stud 21. Here, a detailed description is provided of grease nipple 35 and embedded plug 37.

Figure 8:
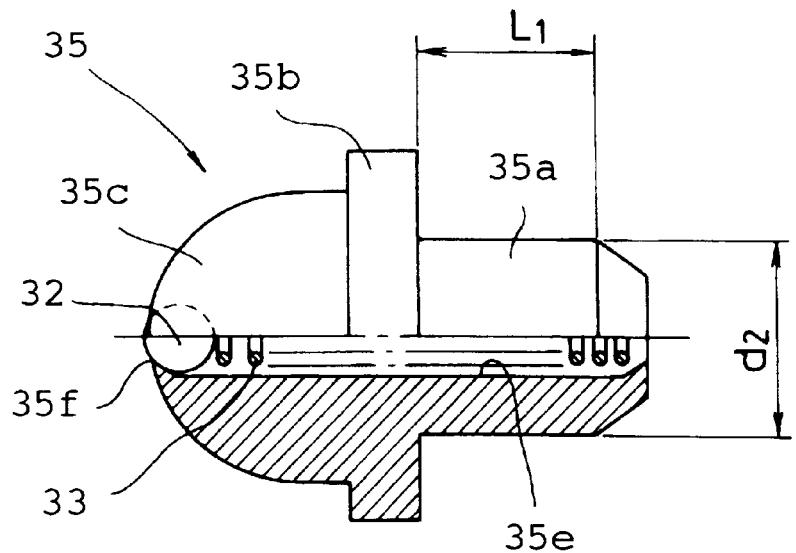
FIG. 8 is a front view, including partial cross-section, of a grease nipple attached to the track roller bearing with stud shown in FIG. 6.

As shown in FIG. 8, grease nipple 35 has flange 35*b* and supply portion 35*c* continuing from the fitting portion 35*a*. The flange 35*b* performs positioning in the axial direction by making contact with the end surface of stud 21.

Supply hole 35*e* is formed in the central axis of grease nipple 35. Steel ball 32 is arranged on the side of supply portion 35*c* of this supply hole 35*e*, which is also provided with compressed coil spring 33 that applies force to the steel ball 32. The steel ball 32 acts as a check valve that blocks supply port 35*f*.

Figure 9:
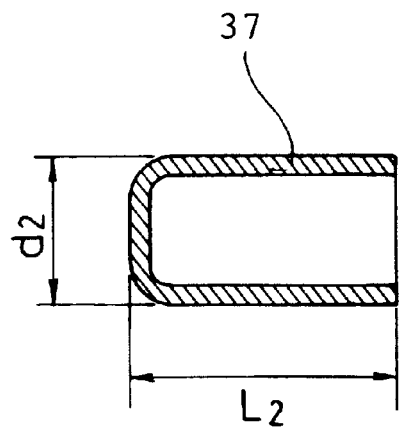
FIG. 9 is a cross-sectional view in the axial direction of an embedded plug attached to the track roller bearing with stud shown in FIG. 6.

On the other hand, as shown in FIG. 9, the shape of the cross-section of embedded plug 37 is formed into the shape of a rounded cup. This is formed by press forming a thin steel sheet.

Figure 1:
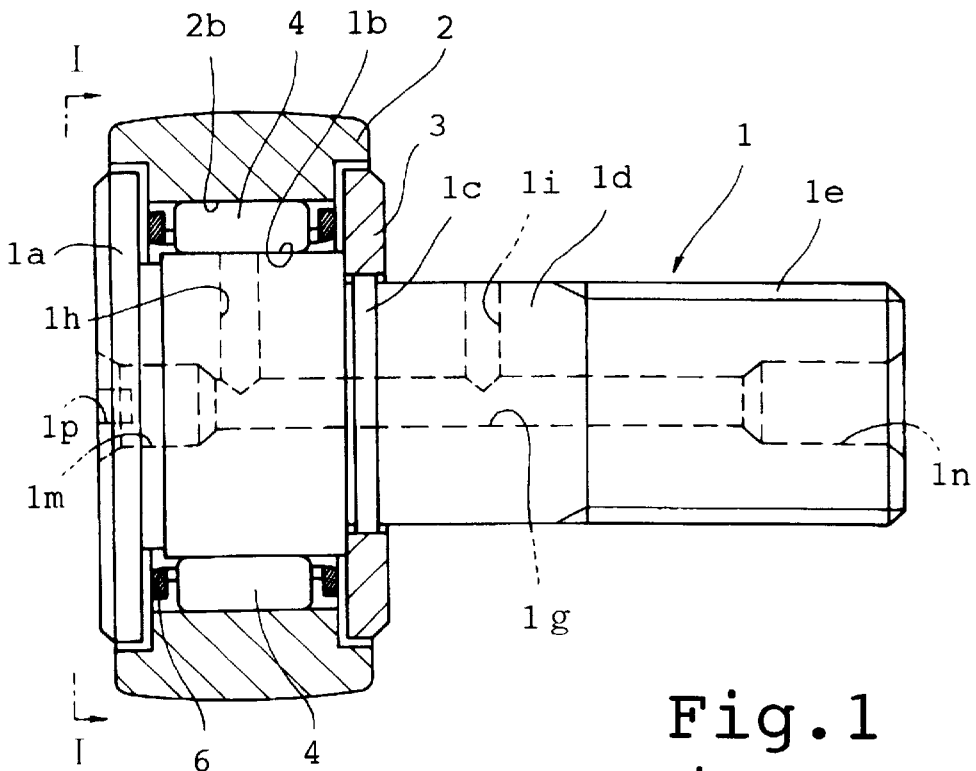
FIG. 1 is a front view, including a partial cross-section, of a track roller bearing with stud as an example of the prior art.
Figure 2:
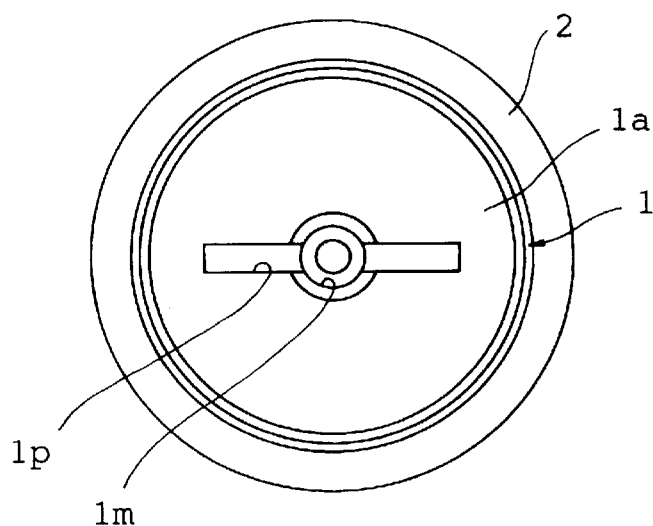
FIG. 2 is a view taken along arrows I—I of the track roller bearing with stud shown in FIG. 1.
Figure 3:
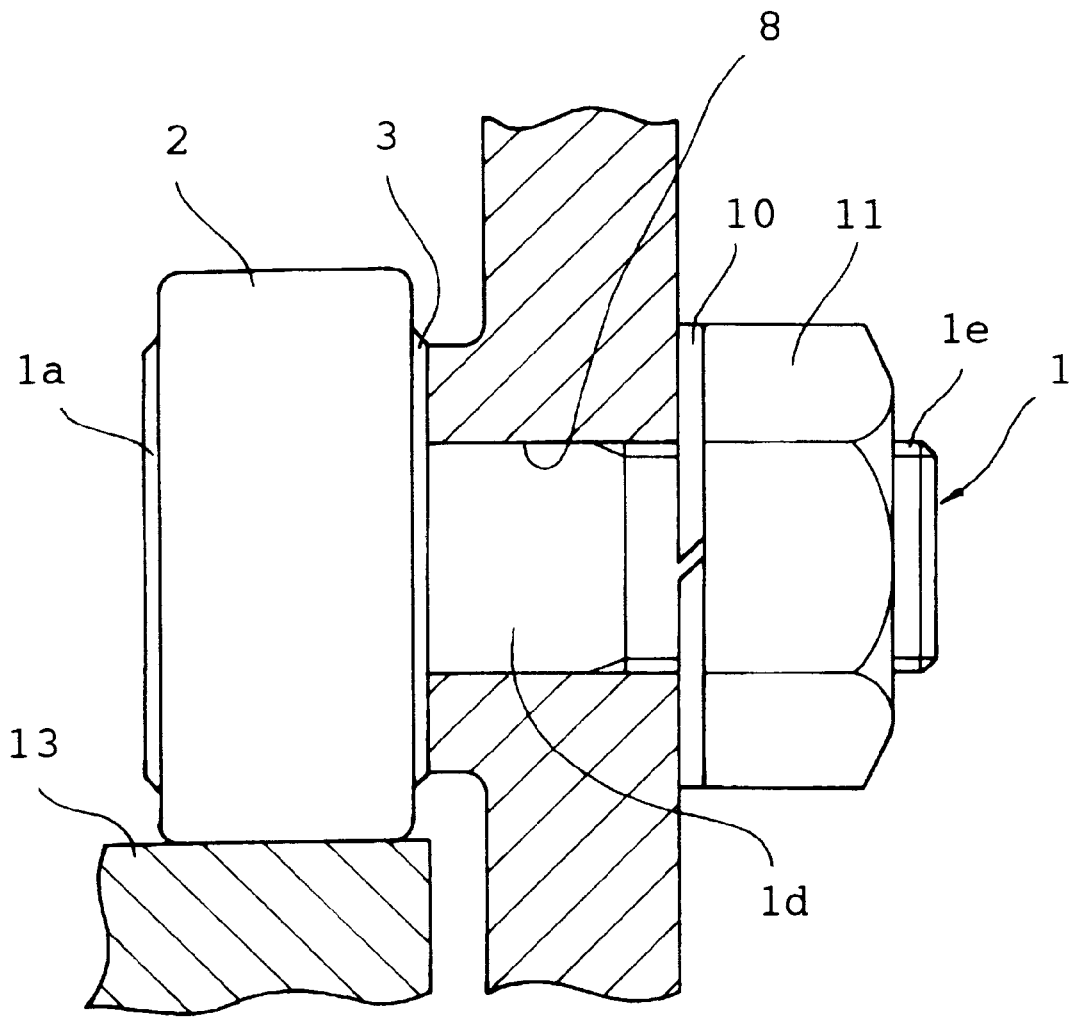
FIG. 3 is a front view, including a partial cross-section, that shows the state in which the track roller bearing with stud shown in FIG. 1 is attached to a portion of an apparatus.
Figure 4:
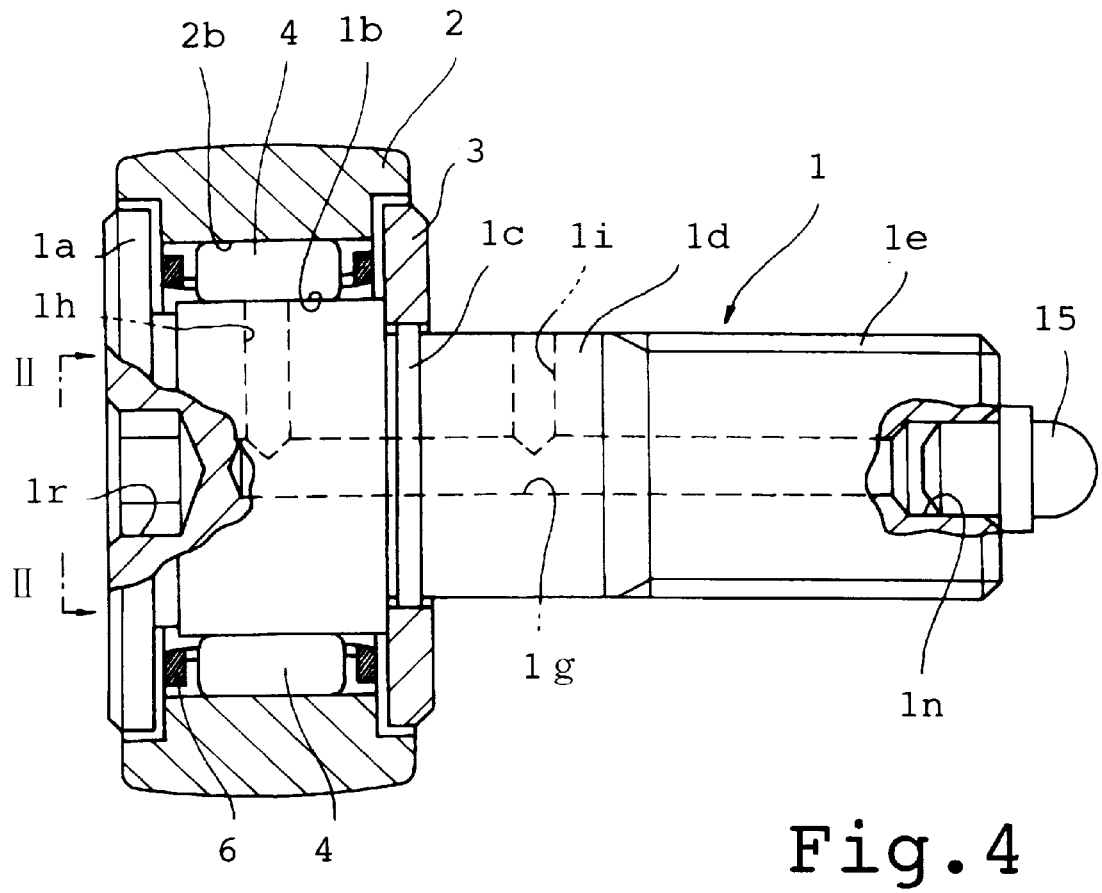
FIG. 4 is a front view, including a partial cross-section, of a track roller bearing with stud as another example of the prior art.
Figure 5:
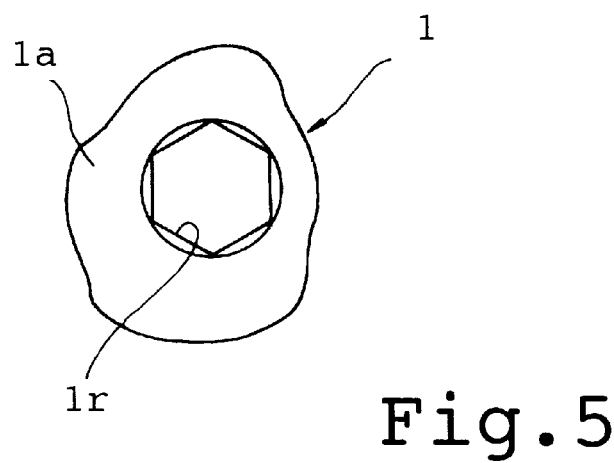
FIG. 5 is a view taken along arrows II—II of the track roller bearing with stud shown in FIG. 4.
Figure 10:
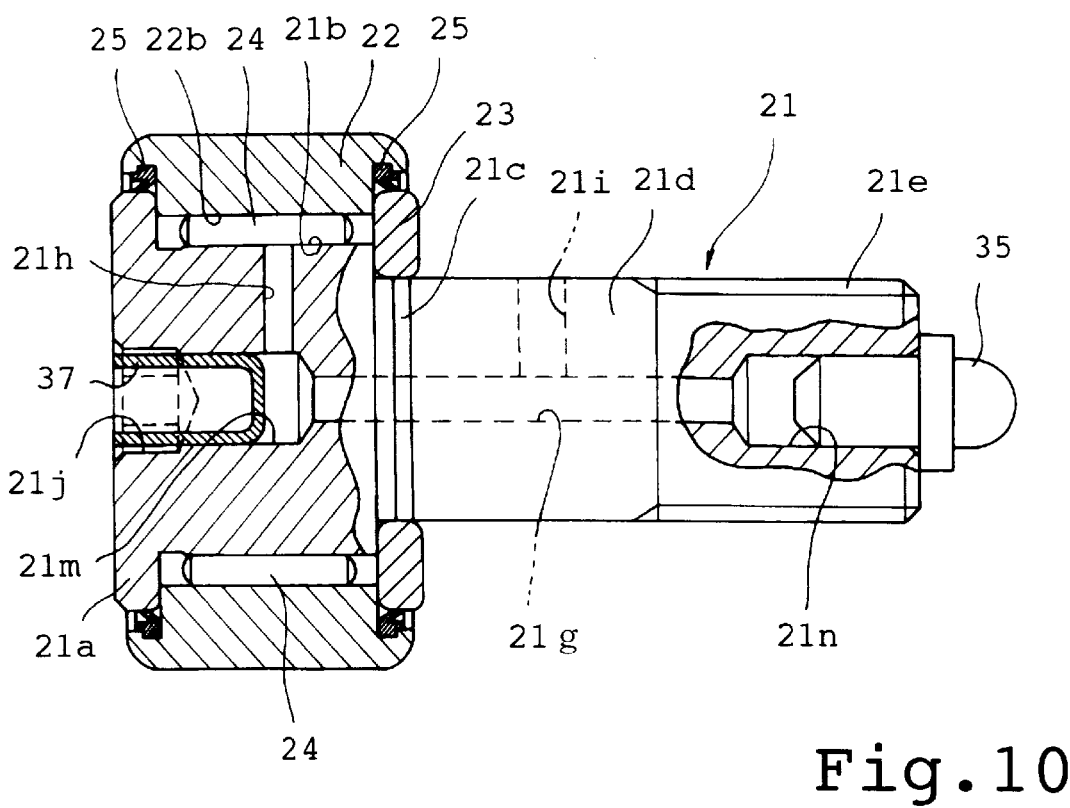
FIG. 10 is a front view, including a partial cross-section, of the state in which the grease nipple and embedded plug are attached in reverse with respect to the track roller bearing with stud shown in FIG. 6.

The track roller bearing with stud of the present embodiment is also attached to a machine tool and so forth in the same manner as that shown in FIG. 3. At the time of use, if the lubricant used is grease, a worker attaches the grease nipple 35 to either of the lubricant supply ports 21*m* or 21*n*, whichever makes lubrication work easier. Embedded plug 37 is attached to the lubricant supply port that is not used in order to plug it. In other words, as shown in FIGS. 6 and 10, the positions at which grease nipple 35 and embedded plug 37 are arranged can be set as desired according to ease of lubrication work. If the situation is such that lubrication can be performed from both end surfaces of stud 21, then grease nipple 35 is attached to both end surfaces.

Since lubricant supply port 21*m* continuing from the hexagonal hole 21*j* is formed in this track roller bearing with stud in addition to lubricant supply port 21*n* on the side of threaded portion 21*e* of stud 21, lubrication work can be performed from either end surface of stud 21 thereby making handling easier.

In particular, by making the lubricant supply ports 21*m* and 21*n* to mutually be of the same diameter and depth, and making the diameters of fitting portion 35*a* of grease nipple 35 and embedded plug 37 to be of the same diameter, while also being of a length that enables them to reach to the lubricant supply port 21*m*, it is possible to attach grease nipple 35 and embedded plug 37 to either lubricant supply port.

Furthermore, although a grease nipple and embedded plug can be arranged in lubricant supply ports 21*m* and 21*n* in both end surfaces of stud 21 in the present embodiment, in the case of using oil for the lubricant, plugs for arranging oil supply pipes should be arranged in the lubricant supply ports.

Figure 11:
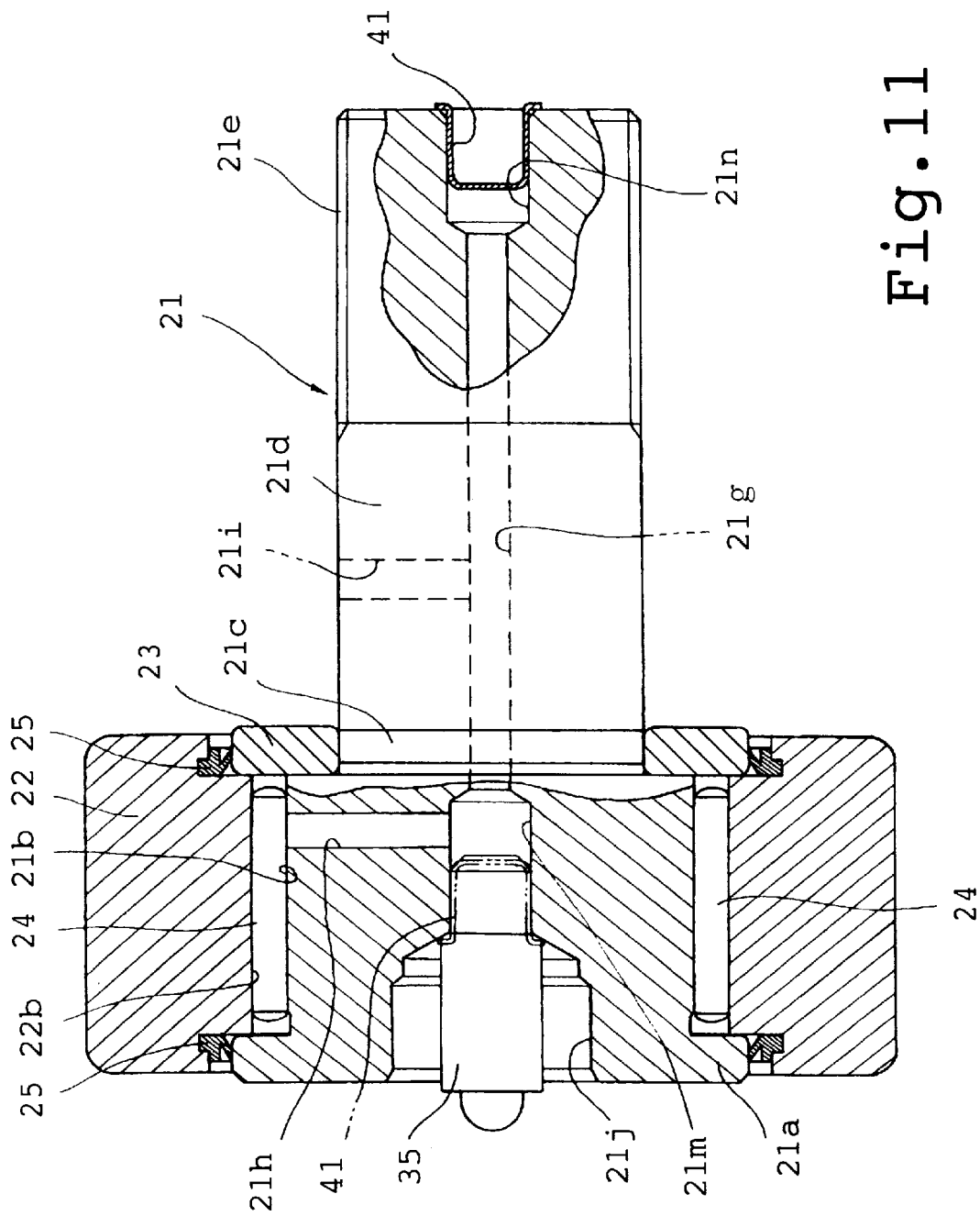
FIG. 11 is a front view, including a partial cross-section, of a track roller bearing with stud as a second embodiment of the present invention.

FIG. 11 shows a track roller bearing with stud as a second embodiment of the present invention.

This track roller bearing with stud is larger than the bearing of the first embodiment. Those constituent members that correspond to the first embodiment are indicated with the same reference numerals. An explanation of those constituent members that are similar to those of the first embodiment is omitted, and instead, the explanation only focuses on those constituent members that are different.

This track roller bearing with stud has a large hexagonal hole 21*j* formed in one end surface of stud 21. Thus, since a pushing jig can be inserted into hexagonal hole 21*j* when an embedded plug is inserted into lubricant supply port 21*m* continuing from the hexagonal hole 21*j*, an ordinary short embedded plug 41 can be used. In the case of using this ordinary embedded plug 41, the other lubricant supply port 21*n* can be of an ordinary (conventional) depth since it is not required to be made deeper.

Figure 12:
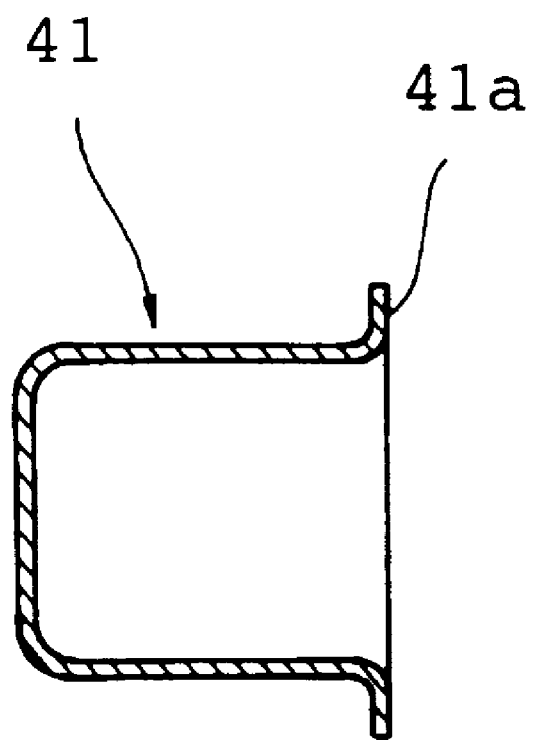
FIG. 12 is a cross-sectional view in the axial direction of an embedded plug attached to the track roller bearing with stud shown in FIG. 11.

However, in the case of attaching embedded plug 41 to the lubricant supply port 21*m*, it must be positioned at the bottom of hexagonal hole 21*j*. Thus, a flanged embedded plug having flange 41*a* is used as shown in FIG. 12. This flanged embedded plug is not limited to the present embodiment, but may also be used in lubricant supply port 21*n* on the side of threaded portion 21*e* in the first embodiment.

Furthermore, although rolling elements in the form of rollers 24 are used in each of the above embodiments, these embodiments may also be in the form of a track roller bearing with stud that uses balls for the rolling elements.

As has been explained above, in the track roller bearing with stud according to the present invention, since a hexagonal hole provided to allow a stud to be rotated by a tightening tool can be formed by forging simultaneous to forging of the stud itself, production cost can be held to a low level.

In addition, since a lubricant supply port continuing from the hexagonal hole is provided in addition to a lubricant supply port on the side of the threaded portion of the stud, lubrication work can be performed from either end surface of the stud, thereby resulting in easier handling.

What is claimed is:

1. A track roller bearing with stud, comprising:
    a stud in the shape of a shaft, said stud comprising in order from one end surface:
        a flange,
        a track portion having an outer circumference which serves as a track surface,
        a side plate engaging portion,
        an attaching portions, and
        a threaded portion;
    an outer ring, said outer ring being in the form of a thick-walled ring having a diameter larger than an outer diameter of said flange, said outer ring having a track surface formed on its inner inside surface and said outer ring being inserted adjacent said stud while being allowed to rotate freely corresponding to the track surface of said stud;
    wherein said flange prevents one end of said outer ring from moving out in an axial direction;
    a plurality of rolling elements juxtaposed between each said track surface of said stud and said outer ring;
    a side plate in the form of a doughnut-shaped plate similar in size to the outer diameter of said flange, said side plate located on the other end of said outer ring from said flange, an inner diameter of said side plate which engages with said side plate engaging portion, and serves to prevent said outer ring and rolling elements, in cooperation with said flange, from moving out in the axial direction;
    said track roller bearing with stud further comprising:
        a hexagonal hole formed in said one end surface of said stud where the flange is disposed, which engages with a tightening tool, and which extends into said track portion;
        a lubricating duct for supplying lubricant, said lubricating duct disposed along an axis of said stud extending from a lubricant supply port formed in the other end surface of said stud at the threaded portion, to each said track surface via a lubricating hole and to the hexagonal hole, said lubricating duct having a first diameter; and,
        a lubrication supply port to which a lubrication apparatus can be attached, formed in the hexagonal hole of said end surface of said stud that connects with said lubricating duct extending from said hexagonal hole;
        wherein said lubrication supply port has a second diameter within said track portion, said second diameter being constant until a position wherein said lubrication supply port meets said lubricating duct past a location wherein said lubricating hole is disposed, at which said second diameter decreases to said first diameter of said lubricating duct.

2. A track roller bearing with stud as set forth in claim 1 wherein said lubrication apparatus is a grease nipple, and said grease nipple is of a length which reaches to said lubricant supply port extending from said hexagonal hole from said end surface of said stud.

3. A track roller bearing with stud as set forth in claim 2, wherein said lubrication supply port extending from said hexagonal hole of said stud and the lubricant supply port on the other end surface of said threaded portion are formed to allow attachment of said grease nipple and, an embedded plug is provided which attaches to one of said lubricant supply port and said lubrication supply port and to which said grease nipple is not attached.

* * * * *